(12) United States Patent
Moon

(10) Patent No.: US 8,851,428 B2
(45) Date of Patent: Oct. 7, 2014

(54) CABLE FIXING BRACKET AND MANUFACTURING METHOD THEREOF

(76) Inventor: Seung Moon, Incheon (KR)

( * ) Notice: Subject to any disclaimer, the term of this patent is extended or adjusted under 35 U.S.C. 154(b) by 0 days.

(21) Appl. No.: 13/395,639

(22) PCT Filed: Sep. 13, 2010

(86) PCT No.: PCT/KR2010/006240
§ 371 (c)(1),
(2), (4) Date: Mar. 12, 2012

(87) PCT Pub. No.: WO2011/031115
PCT Pub. Date: Mar. 17, 2011

(65) Prior Publication Data
US 2012/0168600 A1    Jul. 5, 2012

(30) Foreign Application Priority Data

Sep. 11, 2009  (KR) ................ 10-2009-0086141

(51) Int. Cl.
*F16L 5/00* (2006.01)
*H02G 3/08* (2006.01)
*H02G 3/22* (2006.01)

(52) U.S. Cl.
CPC . *H02G 3/083* (2013.01); *H02G 3/22* (2013.01)
USPC .............................................. 248/65; 248/56

(58) Field of Classification Search
USPC .............. 248/49, 56, 58, 65, 68.1, 74.1, 74.4
See application file for complete search history.

(56) References Cited

U.S. PATENT DOCUMENTS

| 4,089,496 | A | * | 5/1978 | Mizusawa | 248/56 |
| 4,919,370 | A | * | 4/1990 | Martin et al. | 248/56 |
| 4,995,583 | A | * | 2/1991 | De La Fuente | 248/636 |
| 5,257,768 | A | * | 11/1993 | Juenemann et al. | 248/604 |
| 6,334,608 | B1 | * | 1/2002 | Stubler | 267/140.13 |
| 6,595,473 | B2 | * | 7/2003 | Aoki et al. | 248/74.4 |
| 6,892,990 | B2 | * | 5/2005 | Pisczak | 248/74.4 |
| 7,441,732 | B2 | * | 10/2008 | Ferragut et al. | 248/74.1 |
| 7,534,965 | B1 | * | 5/2009 | Thompson | 174/153 G |

FOREIGN PATENT DOCUMENTS

| JP | 2002-112438 | 4/2002 |
| JP | 2004-312927 | 11/2004 |
| KR | 2019930007330 | 4/1993 |
| KR | 1019970039092 | 7/1997 |

* cited by examiner

*Primary Examiner* — Steven Marsh
(74) *Attorney, Agent, or Firm* — Revolution IP, PLLC

(57) ABSTRACT

A cable fixing bracket includes: a fixed section fixed to a supporting body; a connection section integrally extended from one surface of the fixed section; and a cable supporting section folded from the end section of the connection section to be integrally extended towards the other surface of the fixed section and supporting a cable. The cable fixing bracket is manufactured integrally in a single process, thereby simplifying the manufacturing process, reducing the manufacturing cost and improving productivity.

6 Claims, 7 Drawing Sheets

CABLE FIXING BRACKET AND MANUFACTURING METHOD THEREOF

BACKGROUND OF THE INVENTION

The present invention relates to a cable fixing bracket that fixes a cable to a structure and to a method for manufacturing the cable fixing bracket.

A cable is provided with a wire for plugging in or power delivery and is used for delivering electricity or driving torque. The cables used in a vehicle, for example, are a parking brake cable, a hood open switch cable, a trunk open switch cable, a transmission control cable of an AT vehicle, and so on.

The cables have problems that a sheath of the cable peels off by being rubbed against a vehicle body due to vibration of the vehicle or cables are entangled with each other. For preventing such problems, the cables are fixed to the vehicle body through a bracket. In addition, a vibration-isolating member is provided at the bracket so as to prevent vibration of the vehicle body from being transmitted to the cable.

After a fixing plate fixed to the vehicle body by a bolt and a cable supporting body of cylindrical shape into which the cable is inserted and by which the cable is supported so as to be isolated from the vibration are manufactured separately, the fixing plate and the cable supporting body are assembled through welding according to a presently used bracket.

However, since the fixing plate and the cable supporting body are assembled through welding after being manufactured separately, production cost and manufacturing time of the bracket may increase.

In addition, the fixing plate and the cable supporting body are welded. At this time, poor welding may occur and inferiority rate may be increased.

SUMMARY OF THE INVENTION

The present invention has been made in an effort to provide a cable fixing bracket having advantages of simplifying manufacturing process, reducing manufacturing cost, and improving productivity by integrally manufacturing the bracket in a single process.

In addition, the present invention has been made in an effort to provide a cable fixing bracket having further advantages of reducing assembly process and inferiority rate by eliminating welding process for assembling various parts.

A cable fixing bracket according to an exemplary embodiment of the present invention includes a fixed section adapted to be fixed to a supporting body by forming at least one of engaging holes thereon and having a surface on which a first vibration-isolating member for reducing vibration is positioned, a connection section protruded from the surface of the fixed section to a first direction, and a cable supporting section extending from an end of the connection section to a second direction opposite to the first direction, and have an inside adapted to be filled with a vibration-isolating member supporting a cable. A partition is protruded perpendicularly to a plane of the fixed section from an edge portion of the fixed section. At this time, the fixed section, the connection section, and the cable supporting section are integrally formed with each other by pressing a single metal plate. Therefore, manufacturing is facilitated.

In addition, a length of the cable supporting section is longer than that of the connection section. At least one of catching parts for fixing the second vibration-isolating member is protruded from an interior circumference of the cable supporting section. In addition, the partitions are protruded perpendicularly to the plane of the fixed section at the edge portions of the fixed section positioned diagonally. The connection section and the cable supporting section have elliptical cross-sections, and the partitions are positioned at the edge portions on an extended minor axis of the connection section so as to enhance structural stability.

Meanwhile, a method of manufacturing the cable fixing bracket according to an exemplary embodiment of the present invention may include following steps.

In further detail, the connection section is formed to have a hollow cylindrical shape, the cable supporting section extends from the end of the connection section toward the inside of the connection section, and the length of the cable supporting section is longer than that of the extended portion.

The method includes (A) forming a first protruding portion of cylindrical shape that is a cable supporting section at a surface of a plane portion, (B) integrally forming a second protruding portion of cylindrical shape that is a connection section at the other surface of the plane portion by pushing the first protruding portion toward a direction opposite to a protruded direction of the first protruding portion, (C) opening an end portion of the first protruding portion, and (D) manufacturing a fixed section by forming a partition and an engaging hole at the plane portion. Further, the step (A) includes (a) protruding the first protruding portion, (b) forming a convex annular protrusion to a circumferential direction of the first protruding portion, and (c) heightening a height of the first protruding portion by repetitively forming the first protruding portion.

In addition, the step (B) is done by pressing a circumferential surface of the first protruding portion toward the other surface of the plane portion. (d) forming an extended portion that is folded at a circumferential portion of an end portion of the first protruding portion by cutting the blocked end portion of the first protruding portion to have a diameter smaller than that of the first protruding portion, and (e) prolonging the length of the first protruding portion by unfolding the extended portion are included.

In addition, after the step (D), (E) forming a first vibration-isolating member at the plane portion, and (F) forming a second vibration-isolating member at an interior surface of the first protruding portion are further included. Further, the second vibration-isolating member is formed through insert injection molding.

Since a fixed section fixed to a supporting body and a cable supporting section supporting a cable are integrally formed according to an exemplary embodiment of the present invention, manufacturing process may be simplified, production cost may be reduced, and productivity may be improved.

Since additional assembly process such as welding for connecting the fixed section to the cable supporting section is not necessary, assembly process may be simplified and inferiority rate such as bad welding may be reduced.

DETAILED DESCRIPTION OF THE INVENTION

Figure 1:
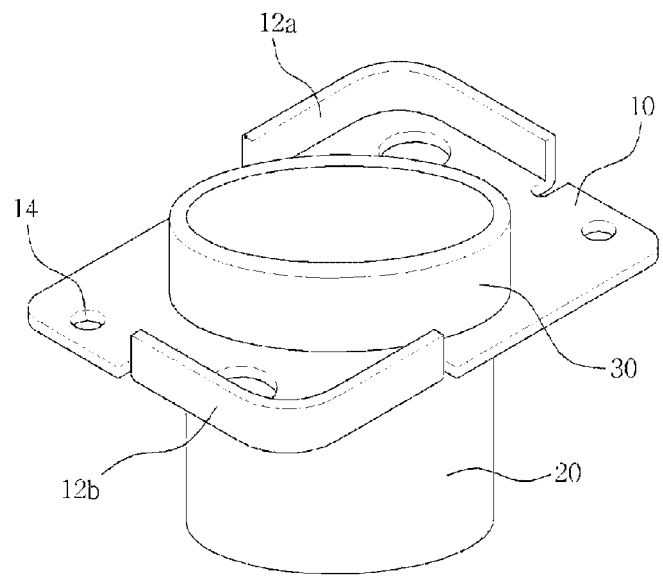
FIG. 1 is a perspective view for showing a part of a cable fixing bracket according to an exemplary embodiment of the present invention.

The present invention will be described more fully hereinafter with reference to the accompanying drawings, in which exemplary embodiments of the invention are shown. The present invention, however, can be realized by various embodiments and is not limited to the exemplary embodiment explained herein. Similar elements in the specification are denoted by the same reference numeral.

Figure 2:
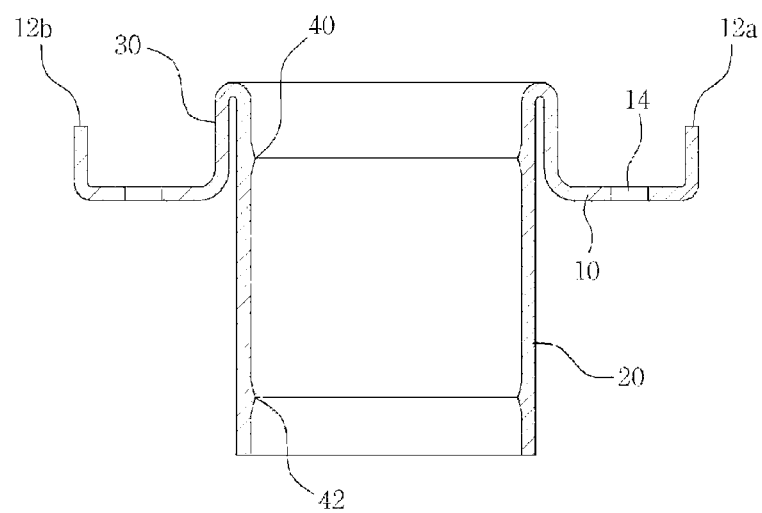
FIG. 2 is a cross-sectional view of an exemplary embodiment shown in FIG. 1.
Figure 3:
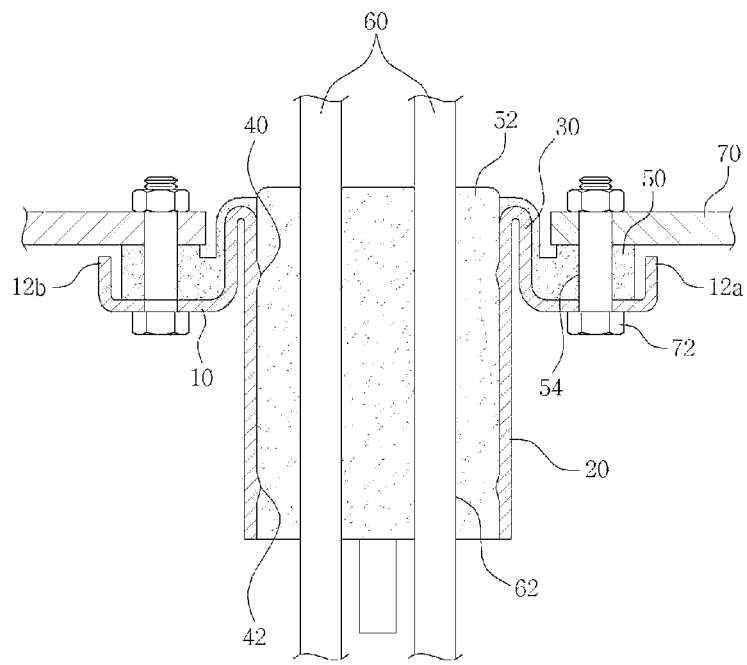
FIG. 3 is a cross-sectional view for showing use of a cable fixing bracket according to an exemplary embodiment of the present invention.

Referring to FIG. 1 to FIG. 3, a cable fixing bracket according to an exemplary embodiment of the present invention will be described in detail.

FIG. 1 is a perspective view for showing a part of a cable fixing bracket according to an exemplary embodiment of the present invention, FIG. 2 is a cross-sectional view of an exemplary embodiment shown in FIG. 1, and FIG. 3 is a cross-sectional view for showing use of a cable fixing bracket according to an exemplary embodiment of the present invention.

Referring to FIG. 1 and FIG. 2, the cable fixing bracket according to the present exemplary embodiment includes a fixed section 10 fixed to a vehicle body, a cable supporting section 20 integrally formed with the fixed section 10 and supporting a cable, and a connection section 30 integrally connecting the cable supporting section 20 with the fixed section 10.

The fixed section 10 has a plane shape, and first and second partitions 12a and 12b for preventing separation of a first vibration-isolating member 50 when the first vibration-isolating member 50 is mounted are bent vertically to a first direction at edges of both sides. In addition, engaging holes 14 through which a screw penetrates so as to be threaded to a supporting body such as a vehicle frame are formed at the fixed section 10.

At this time, the partition can be formed at any one edge portion of the fixed section or the partitions can be formed at all the edge portions of the fixed section that is a polygon.

The connection section 30 integrally extends perpendicularly to a surface of the fixed section 10, and an inside of the connection section 30 is hollow. The connection section 30 has cylindrical shape, upper end lower ends of which are open. Further, the connection section 30 has an elliptical shape, and a major axis thereof may be disposed to a diagonal direction of the fixed section 10.

The cable supporting section 20 is protruded toward the other surface of the fixed section 10 after being folded from an end portion of the connection section 30 toward the inside of the connection section 30. The cable fixing bracket has a shape such that the connection section 30 and the cable supporting section 20 are overlapped at the surface of the fixed section 10 with respect to the fixed section and the cable supporting section 20 extends at the other surface of the fixed section 10.

A cross-sectional shape of the cable supporting section 20 is the same as that of the connection section 30, and a cross-section of the cable supporting section is smaller than that of the connection section 30. At this time, upper and lower ends of the cable supporting section are open.

In addition, at least one of catching parts 40 and 42 are protruded circumferentially at an interior surface of the cable supporting section 20. The catching parts 40 and 42 prevent separation of the vibration-isolating member 40 injection-molded to the interior surface of the cable supporting section 20.

The catching parts 40 and 42 may include a first catching part 40 formed close to an inlet of the cable supporting section 20 and a second catching part 42 formed close to the other inlet of the cable supporting section 20. Or, more than three catching parts 40 and 42 may be formed.

As shown in FIG. 3, the cable fixing bracket further includes a first vibration-isolating member 50 interposed between the cable fixing bracket and the vehicle body 70 and reducing vibration when the cable fixing bracket is fixed to the supporting body and a second vibration-isolating member isolating vibration between the cable 60 and the cable fixing bracket when the cable 60 is fixed to the bracket.

The first vibration-isolating member 50 may be made of elastic material such as rubber or silicon, and is mounted at the side of the fixed section 10. The first vibration-isolating member 50 is protruded higher than the partitions 12a and 12b of the fixed section 10 so as to be connected to the vehicle body 70. At this time, the fixed section 10 provided with the engaging hole 14 and the vehicle body 70 provided with a penetration hole 54 communicated to the engaging hole 14 are coupled by a bolt 72 threaded to the engaging hole and the penetration hole. In addition, a middle portion of the first vibration-isolating member has a cylindrical shape so as to be enclosed by the connection section 30.

The second vibration-isolating member 52 is made of an elastic material such as rubber or silicon, and is formed at the interior surface of the cable supporting section 20 through extruding. At this time, a plurality of cable mounting holes 62 for passing through the cable 60 is formed according to the number of the cables.

In addition, the first vibration-isolating member 50 and the second vibration-isolating member 52 may be integrally formed with each other or may be manufactured separately and be assembled to the bracket.

FIG. 4 to FIG. 12 are schematic diagrams for showing manufacturing process of a cable fixing bracket according to an exemplary embodiment of the present invention.

Manufacturing process of the cable fixing bracket that is structured as described above will be described in detail.

Figure 4:
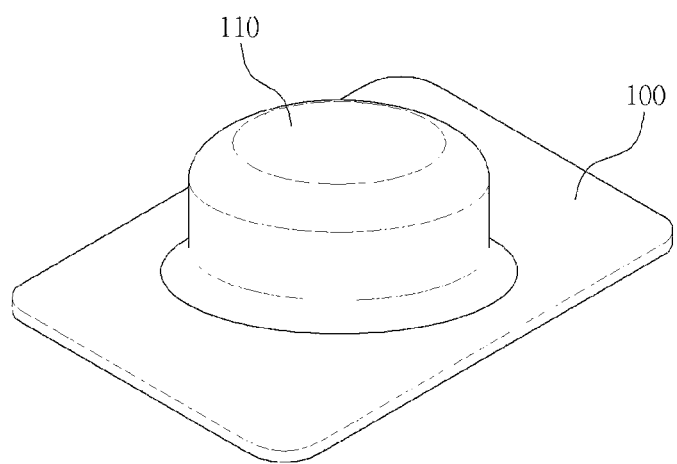
FIG. 4 to FIG. 12 are schematic diagrams for showing manufacturing process of a cable fixing bracket according to an exemplary embodiment of the present invention.

As shown in FIG. 4, a plane portion 100 that is a metal plane having a constant thickness is formed to be bulged upwardly. At this time, the plane portion is made of metal material that is used for pressing. Then, the first protruding portion 110 of hollow cylindrical shape is formed upwardly to have a predetermined height on the plane portion 100.

Figure 5:
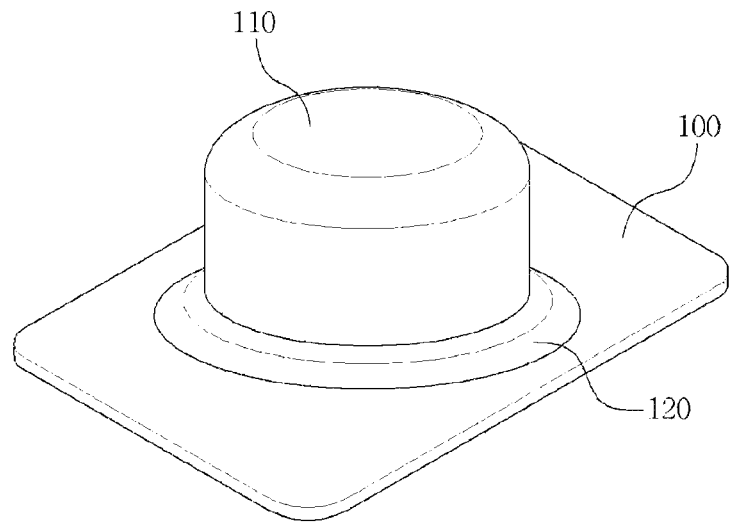

After that, a convex annular protrusion 120 is formed circumferentially at an edge of the surface of the first protruding portion 110, as shown in FIG. 5.

Figure 6:
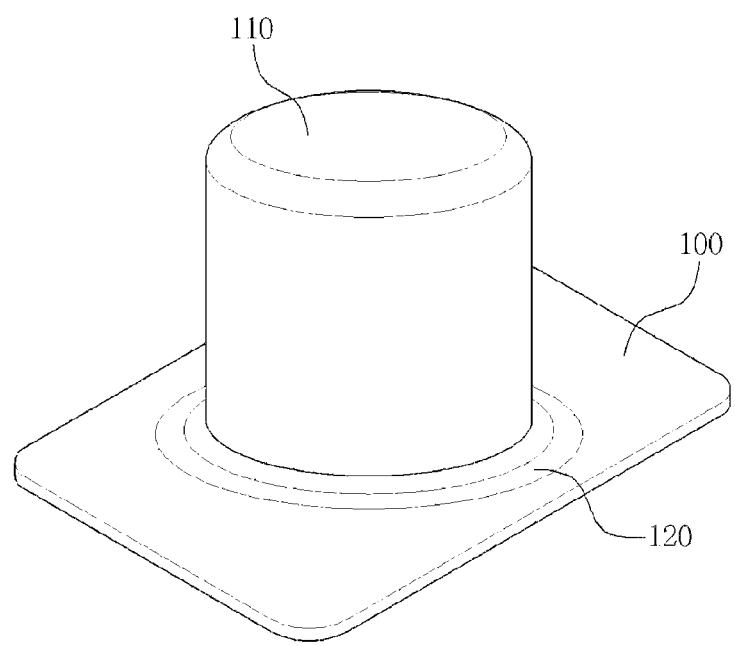

In addition, the first protruding portion 110 is pressed several times so as to heighten a height of the first protruding portion 110, as shown in FIG. 6. At this time, if the height of the first protruding portion 110 is heightened by a single pressing process, a crack may occur at the plane portion 100 or the plane portion 100 may be torn. Therefore, the height of the first protruding portion 110 is gradually heightened through repetitive pressing processes.

When the repetitive pressing processes are performed so as to heighten the height of the first protruding portion 110, the annular protrusion 120 widens gradually and is supplied to the first protruding portion. Therefore, occurrence of the crack at the plane portion 110 or tear of the plane portion may be prevented.

Figure 7:
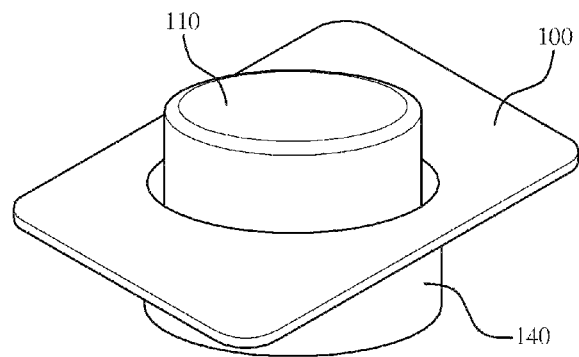
Figure 8:
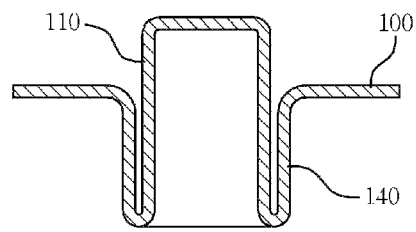

In addition, the first protruding portion 110 is drawn out to an opposite direction of a protruded direction of the first protruding portion 110 by a predetermined length such that the second protruding portion 140 is formed at the other surface of the plane portion 100, as shown in FIG. 7 and FIG. 8. That is, the edge of the first protruding portion 110 is pressed to a downward direction of the plane portion 100 in the drawings such that the second protruding portion 140 is formed at the other surface of the plane portion. Thereby, the first protruding portion 110 is shaped such that the first protruding portion 110 is inserted in an interior surface of the second protruding portion 140.

Figure 9:
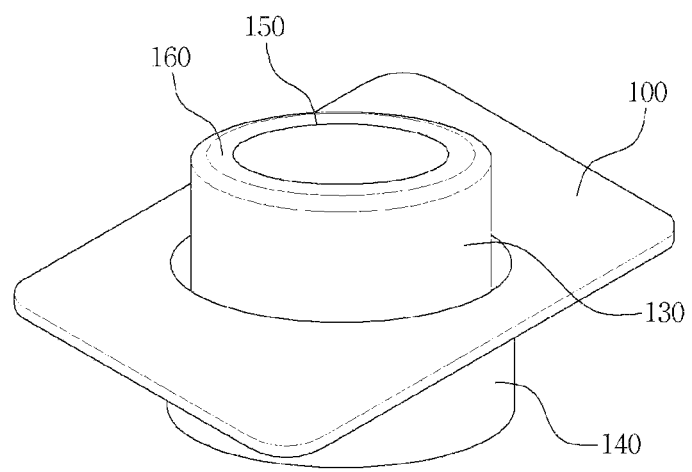

In addition, a blocked end of the first protruding portion 110 is cut so as to form an opening 150 having a diameter smaller than that of the first protruding portion 110, as shown in FIG. 9. Since the diameter of the opening 150 is smaller than that of the first protruding portion 110, an extended portion 160 that is folded inwardly remains at an end portion of the first protruding portion 110.

Figure 10:
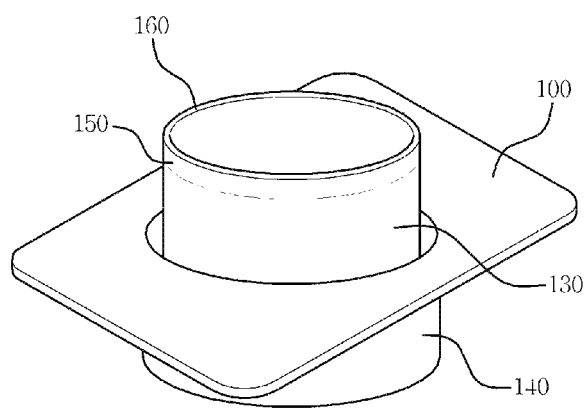
Figure 11:
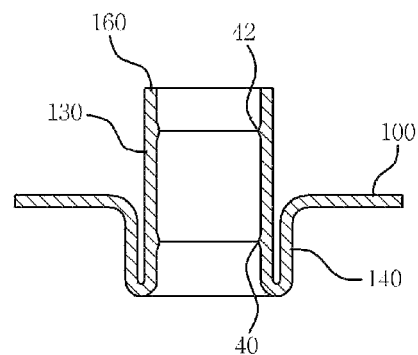

After that, the extended portion 160 formed at the end portion of the first protruding portion 110 is unfolded so as to prolong the length of the first protruding portion 110 as shown in FIG. 10 and FIG. 11. That is, if a punch is inserted from a downside to an upside in the interior surface of the first protruding portion 110 and the extended portion is pressed, the folded extended portion 160 is unfolded and the length of the first protruding portion 110 is prolonged. In addition, a plurality of catching parts 40 and 42 is formed at the interior surface of the first protruding portion 110.

Figure 12:
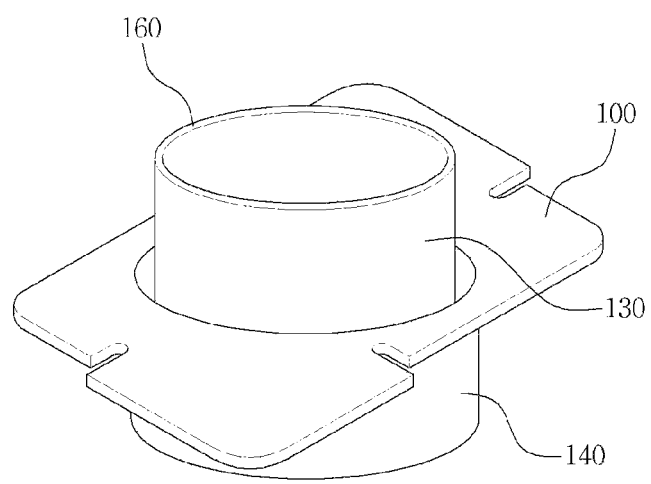

After that, the first and second partitions 12a and 12b and the engaging hole 14 are formed at the plane portion 100, as shown in FIG. 12.

If the cable fixing bracket is formed as described above, the first protruding portion 110 becomes the cable supporting section 20, the second protruding portion 140 becomes the connection section 30, and the plane portion 100 becomes the fixed section 10.

Figure 13:
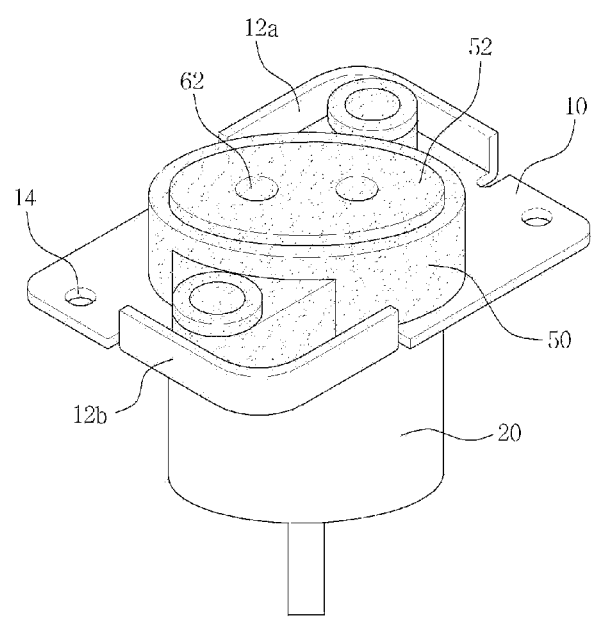
FIG. 13 is a perspective view for showing use of a cable fixing bracket according to an exemplary embodiment of the present invention.

In addition, the first vibration-isolating member 50 and the second vibration-isolating member 52 are mounted at the cable fixing bracket and then a product is manufactured, as shown in FIG. 13. At this time, the first vibration-isolating member 50 may be manufactured separately and be mounted at the fixed section 10, and the second vibration-isolating member 52 is formed at the interior surface of the cable supporting section 20 through injection molding.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of manufacturing a cable fixing bracket, comprising:
    (A) forming a first protruding portion of cylindrical shape that is a cable supporting section at a surface of a plane portion,
    (B) integrally forming a second protruding portion of cylindrical shape that is a connection section at the other surface of the plane portion with the first protruding portion by pushing the first protruding portion toward a direction opposite to a protruded direction of the first protruding portion, wherein at least a part of the first protruding portion is positioned at a radial inside of the second protruding portion,
    (C) opening an end portion of the first protruding portion, and
    (D) manufacturing a fixed section by forming a partition and an engaging hole at the plane portion, wherein the partition is spaced apart from the first protruding portion and the second protruding portion.

2. The method of claim 1, wherein the step (A) comprises:
    (a) protruding the first protruding portion,
    (b) forming a convex annular protrusion to a circumferential direction of the first protruding portion, and
    (c) heightening a height of the first protruding portion by repetitively forming the first protruding portion.

3. The method of claim 1, wherein the step (B) is done by pressing a circumferential surface of the first protruding portion toward the other surface of the plane portion.

4. The method of claim 1, wherein the step (C) comprises:
    (d) forming an extended portion that is folded at a circumferential portion of an end portion of the first protruding portion by cutting the blocked end portion of the first protruding portion to have a diameter smaller than that of the first protruding portion, and
    (e) prolonging the length of the first protruding portion by unfolding the extended portion.

5. The method of claim 1, after the step (D) further comprising:
    (E) forming a first vibration-isolating member at the plane portion between the cable fixing bracket and a supporting body for reducing vibration when the cable fixing bracket is fixed to the supporting body, and
    (F) forming a second vibration-isolating member at an interior surface of the first protruding portion and provided between a cable and the cable fixing bracket for supporting the cable.

6. The method of claim 5, wherein the second vibration-isolating member is formed through insert injection molding.

* * * * *